UNITED STATES PATENT OFFICE.

MAJOR E. HOLMES, OF LAKEWOOD, OHIO, ASSIGNOR TO NATIONAL CARBON COMPANY, OF CLEVELAND, OHIO, A CORPORATION OF NEW JERSEY.

BATTERY-DEPOLARIZER.

1,216,451.     Specification of Letters Patent.     Patented Feb. 20, 1917.

No Drawing.     Application filed November 22, 1913. Serial No. 802,541.

*To all whom it may concern:*

Be it known that I, MAJOR E. HOLMES, a citizen of the United States, residing at Lakewood, in the county of Cuyahoga and State of Ohio, have invented a certain new and useful Improvement in Battery-Depolarizers, of which the following is a full, clear, and exact description.

One of the most important considerations in the choice of a depolarizer for dry cells is its effect on the so-called "shelf life" or deterioration during periods of open circuit or inactivity. Some depolarizers having a high available oxygen content are very satisfactory during use, but if allowed to stand a considerable time they lose some of their depolarizing value.

The use of artificial depolarizers such as precipitated manganese dioxid and acid manganites is well known and they have been found to possess very good depolarizing properties. Artificial manganese dioxid as well as other artificial depolarizers, however, are so expensive to manufacture in the required purity that their use is precluded in any but the smallest midget cells, and even in these the application is limited.

Other depolarizers on account of their acidity are undesirable becaus a certain amount of acid will be liberated from the electrolyte which is usually neutral. Any acid thus formed will attack the zinc more or less and cause a consumption thereof which in time would make the battery useless. I have found that hydrated manganese dioxid and acid manganites on account of their acid reaction, possess this disadvantage, although as previously set forth they are satisfactory as far as their depolarizing value is considered.

To obtain a cheap, non-acid depolarizer is the object of this invention.

To prevent the foregoing deleterious action it has been found that neutral manganites may be used to advantage. The use of a neutral manganite as a depolarizer does not permit the formation of any acid in the battery during the period of inactivity so that the zinc will not be attacked nor the reaction of the electrolyte altered. The neutral manganites may be manufactured by mixing hydrated manganese dioxid with a base such as calcium hydroxid, sodium hydroxid, etc. Other reagents may also be used, that given being merely illustrative.

Among the neutral manganites it has been found that the mangano-manganites are particularly satisfactory. The double manganites are also within the scope of my invention. The formulas of some of the compounds included by my invention are as follows: $CaO.MnO_2$; $MnO.MnO_2$; $CaO.K_2O.(MnO_2)_2$; $CaO.MnO_2.H_2O$; $Ca(NH_4)_2.(MnO_2)_2$, etc. It will be understood there are a very large number of these compounds, which may be expressed by the general formula; $xMO.yMnO.zMnO_2$. In this formula "MO" represents a base or metal oxid and may be combined in various proportions with the MnO and $MnO_2$. The coefficient $x$ of the "MO" portion of the compound as well as the coefficient $y$ of "MnO" portion may have values from zero up, but of course, both cannot be zero at the same time if a manganite is to be obtained. The coefficient $z$ of the "$MnO_2$" portion of the compound may have a value of one or more. Since the compound is preferably dehydrated before being placed in use no water of hydration is given in the formula, but it will be understood that there is some present in the compound nevertheless before it is dehydrated.

Such compounds have an excellent depolarizing value and may be manufactured at a much lower cost than previous artificial depolarizers. They also prevent the liberation of acids which attack the zinc and produce the disadvantages previously set forth.

Having described my invention what I claim is:

1. In a dry cell, positive and negative electrodes and a depolarizer consisting of a neutral manganite.

2. In a dry cell, positive and negative electrodes and a mix containing a plurality of neutral manganites as depolarizer.

In testimony whereof, I hereunto affix my signature.

MAJOR E. HOLMES.

Witnesses:
  IRA J. ADAMS,
  H. G. GROVER.